US012586390B2

(12) United States Patent
Kharas et al.

(10) Patent No.: US 12,586,390 B2
(45) Date of Patent: Mar. 24, 2026

(54) SYSTEMS, METHODS, AND COMPUTER-READABLE MEDIA FOR CHARACTERIZING MICROSPHERIC MATERIAL

(71) Applicant: BASF Corporation, Florham Park, NJ (US)

(72) Inventors: Karl C. Kharas, Iselin, NJ (US); Ke-Bin Low, Iselin, NJ (US); David J. Camerota, Attapulgus, GA (US); Xingtao Gao, Iselin, NJ (US)

(73) Assignee: BASF CORPORATION, Florham Park, NJ (US)

( * ) Notice: Subject to any disclaimer, the term of this patent is extended or adjusted under 35 U.S.C. 154(b) by 297 days.

(21) Appl. No.: 18/577,618

(22) PCT Filed: Jul. 13, 2022

(86) PCT No.: PCT/US2022/036970
§ 371 (c)(1),
(2) Date: Jan. 8, 2024

(87) PCT Pub. No.: WO2023/287888
PCT Pub. Date: Jan. 19, 2023

(65) Prior Publication Data
US 2025/0014366 A1 Jan. 9, 2025

Related U.S. Application Data

(60) Provisional application No. 63/203,217, filed on Jul. 13, 2021.

(51) Int. Cl.
G06V 20/69 (2022.01)
G01N 15/08 (2006.01)
(Continued)

(52) U.S. Cl.
CPC ......... G06V 20/695 (2022.01); G01N 15/088 (2013.01); G06T 7/11 (2017.01);
(Continued)

(58) Field of Classification Search
None
See application file for complete search history.

(56) References Cited

U.S. PATENT DOCUMENTS 7,499,806 B2    3/2009  Kermani et al.
8,712,123 B2    4/2014  Xia et al.
(Continued)

OTHER PUBLICATIONS

"Standard Test Method for Determining Pore Volume Distribution of Catalysts by Mercury Intrusion Porosimetry", ASTM Designation D 4284-92, Jan. 1, 1992, pp. 995-1000.
(Continued)

*Primary Examiner* — David Ometz
(74) *Attorney, Agent, or Firm* — Peter DiMauro

(57) ABSTRACT

Methods, systems, and computer readable media are disclosed for characterizing the porosity of a microspheric material, training a classifier model for classifying spatially-contiguous image regions of backscatter electron scanning electron microscopy (BSE-SEM) images of a microspheric material according to the particle composition of the image regions, and characterizing the elemental composition of a microspheric material. The methods include: receiving image data representative of a microscopic images of a sample microspheric material; segmenting the image data into a plurality of spatially-contiguous image regions; classifying, by a trained machine-learning model, each of the plurality of spatially-contiguous image regions; and characterizing the microspheric material. The disclosure also relates to compositions for use as an FCC catalyst comprising microspheres which comprise alumina and/or clay and/or a zeolite.

20 Claims, 17 Drawing Sheets

(51) Int. Cl.
  *G06T 7/11*          (2017.01)
  *G06V 10/764*        (2022.01)

(52) U.S. Cl.
  CPC .. *G06V 10/764* (2022.01); *G06T 2207/10056*
        (2013.01); *G06T 2207/10061* (2013.01); *G06T*
                                *2207/20084* (2013.01)

(56) References Cited

U.S. PATENT DOCUMENTS

| | | | |
|---|---|---|---|
| 8,795,967 B2 | 8/2014 | Chee et al. | |
| 10,812,815 B2 | 10/2020 | Taylor, II et al. | |
| 10,830,713 B2 * | 11/2020 | Zhang ................ | G01N 23/2251 |
| 2008/0082468 A1 * | 4/2008 | Long .................... | G06V 10/764 |
| | | | 706/12 |
| 2017/0242234 A1 | 8/2017 | Ashcroft et al. | |

OTHER PUBLICATIONS

European Search Report for EP Patent Application No. 22842811.6, Issued on May 26, 2025, 2 pages.
Loucks, et al., "Spectrum of pore types and networks in mudrocks and a descriptive classification for matrix-related mudrock pores", AAPG bulletin, vol. 96, Issue 6, Jun. 1, 2012, pp. 1071-1098.
Mollajan, et al., "Improving pore type identification from thin section images using an integrated fuzzy fusion of multiple classi-fiers", Journal of Natural Gas Science and Engineering, vol. 31, Apr. 2016, pp. 396-404.
International Search Report and Written Opinion of International Application No. PCT/EP2022/036970 mailed Nov. 18, 2022, 10 pgs.

* cited by examiner

2000

AI Prediction

SEM-EDS (Ground-Truth)

SYSTEMS, METHODS, AND COMPUTER-READABLE MEDIA FOR CHARACTERIZING MICROSPHERIC MATERIAL

This disclosure relates to systems, methods, and computer-readable media for characterizing the porosity of a microspheric material, training a classifier model for classifying spatially-contiguous image regions of backscatter electron scanning electron microscopy (BSE-SEM) images of a microspheric material according to the particle composition of the image regions, and characterizing the elemental composition of a microspheric material. This disclosure also relates to compositions for use as a Fluid Catalytic Cracking (FCC) catalyst comprising microspheres which comprise alumina and/or clay and/or a zeolite.

Cracking is a process used for breaking complex organic molecules such as heavy hydrocarbons into simpler molecules achieved by the cleaving of carbon-carbon bonds in the precursors, typically in the presence of a catalyst. The rate of cracking and the nature of the end products are dependent on the conditions under which the process is carried out, such as the temperature, the pressure, and the nature of the molecules and the catalysts.

The catalytic cracking process involves the presence of acid catalysts (usually solid acids such as alumina, silica-alumina and zeolites), which promote a heterolytic breakage of bonds yielding pairs of ions of opposite charges, usually a carbocation and a very unstable hydride anion. Carbon-localized free radicals and cations are both highly unstable and undergo processes of chain rearrangement, C—C scission in position beta (i.e., cracking) and intra- and intermolecular hydrogen transfer or hydride transfer. In both types of processes, the corresponding reactive intermediates (radicals, ions) are permanently regenerated, and thus they proceed by a self-propagating chain mechanism. The chain of reactions is eventually terminated by radical or ion recombination.

One widely used cracking process is Fluid Catalytic Cracking (FCC), which typically employs microspheric catalyst particles suspended in a rising flow of feed hydrocarbons to form a fluidized bed. Typical FCC catalysts contain active crystalline aluminosilicates, principally the faujasite zeolites (e.g., Y zeolite in its various forms such as REY, HY, REHY, USY, REUSY) with ZSM-5 frequently present to improve gasoline product octane and/or improve olefin yield.

In some instances, the zeolite(s) used as the active cracking component and any active inorganic oxide matrix components will be composited in the particles with a binder generally formed from an amorphous gel or sols such as silica sol, which acts to bind the components together on drying. The binder itself may or may not have activity. Fillers such as clays of the kaolin type make up the balance of the catalyst composition. The oxide matrix materials may be attrition resistant, selective with regard to the production of hydrocarbons without excessive coke make, and not readily deactivated by metals. Matrices with cracking activity (active matrices) may be formed to assist in the overall cracking reaction.

In other instances, the zeolite itself acts as a binder and may be the only binder material present. Such FCC catalysts are described in D. M. Stockwell's "Continuous Age Distribution Method for Catalytic Cracking. 1. Proof of Principle" Ind. Eng. Chem. Res. 2015, 54, pp. 5921-593. In the in-situ process, an active matrix, which may be calcined kaolin clay or alumina, is mixed with kaolin clay and spray dried to make microspheres. Metakaolin is produced from kaolinite by calcination. The Y zeolite is crystallized, using metakaolin and silica is leached from calcined clay and, if needed, additional silica, caustic, and seeds are added to the crystallization reactor. The Y zeolite in the resulting in situ crystallized microsphere becomes an acid catalyst and also serves to bind the microsphere together. Incorporated FCC catalysts and additives, such as ZSM-5 additives, often contain kaolin clay as a filler. In situ microspheres do not have kaolin clay as a filler because the kaolin initially present becomes metakaolin after microsphere calcination, and that metakaolin is a reactant to make Y zeolite.

Pores are typically classified according to their sizes: (i) pores with widths exceeding about 50 nm (0.05 pm) are called macropores; (ii) pores of widths between 2 nm and 50 nm are called mesopores; (iii) pores with widths not exceeding about 2 nm are called micropores. K. S. W. Sing et al. "Reporting Physisorption Data for Gas/Solid Systems with Special Reference to the Determination of Surface Area and Porosity (Recommendations 1984)" Pure & Appl. Chem., 1985, Vol. 57, No. 4, pp. 603-619. Mercury porosity is often used to characterize macroporosity in FCC and other catalysts. Pores larger than 2 $\mu$m diameter (20,000 Å) are typically considered to be interparticle pores. However, mercury porosimetry cannot distinguish between large intra-particle macropores and the interparticle space.

In addition, it is necessary to monitor and characterize FCC catalysts to have a better understanding of the catalyst's activity. A variety of characteristics of the FCC catalyst such as porosity, attrition resistance, elemental composition, tolerance of contaminants (such as nickel, vanadium, copper, and iron) all play a role in the catalyst's activity. It is difficult and time consuming to characterize the FCC catalysts in a given industrial or power generation application with any sort of accuracy. This makes it difficult to analyze and optimize the performance of FCC catalysts.

SUMMARY

This disclosure brings machine learning techniques to bear onto the characterizing the porosity of a microspheric material, training a classifier model for classifying spatially-contiguous image regions of backscatter electron scanning electron microscopy (BSE-SEM) images of a microspheric material according to the particle composition of the image regions, and characterizing the elemental composition of a microspheric material. In exemplary processes, the porosity and elemental composition of an FCC catalyst used may then be determined and analyzed to the performance baseline curve.

In particular, this disclosure presents a microsphere analysis tool (MAT) that performs methods, comprising: (a) receiving image data representative of a microscopic images of a sample microspheric material; (b) segmenting the image data into a plurality of spatially-contiguous image regions; (c) classifying, by a trained machine-learning model, each of the plurality of spatially-contiguous image regions as corresponding to one of: (i) a particle, (ii) an intra-particle pore, or (iii) an inter-particle void; and (d) characterizing the porosity of the microspheric material based on at least one of: (i) a count of the intra-particle pores; (ii) an area of the intra-particle pores: (iii) an equivalent diameter of the intra-particle pores: (iv) a pore-area fraction of the intra-particle pores.

This disclosure also presents a method for training a MAT for classifying spatially-contiguous image regions of backscatter electron scanning electron microscopy (BSE-SEM)

images of a microspheric material according to the particle composition of the image regions, comprising: (a) receiving training image data representative of a plurality of BSE-SEM images of one or more sample microspheric materials and its corresponding color-coded energy dispersive x-ray spectroscopy (EDX) images; (b) utilizing the classifier model to overlay the corresponding color-coded EDX over the BSE-SEM images and annotating the plurality of spatially-contiguous BSE image regions of the BSE training images with corresponding EDX image data; and (c) training the classifier model, using the annotated BSE-SEM training image data, to classify spatially-contiguous BSE-SEM image regions of image data representing a BSE-SEM image of a microspheric material according to the particle composition of the image regions.

This disclosure also presents a microsphere analysis tool (MAT) that performs methods, comprising: (a) receiving training image data representative of a first set of BSE-SEM images of one or more sample microspheric materials and its corresponding color-coded energy dispersive x-ray spectroscopy (EDX) images; (b) establishing a threshold value for at least one chemical element based on the EDX images; (c) utilizing the classifier model to overlay the corresponding color-coded EDX over the BSE-SEM images and annotating the plurality of spatially-contiguous BSE image regions of the BSE training images with corresponding EDX image data; (d) training the classifier model, using the annotated BSE-SEM training image data, to classify spatially-contiguous BSE-SEM image regions of image data representing a BSE-SEM image of a microspheric material according to the chemical element of the composition of the image regions; (e) receiving image data representative of a first set of BSE-SEM images of one or more sample microspheric materials; (f) segmenting the image data into a plurality of spatially-contiguous image regions; applying the classifier model, and (g) classifying, by a trained machine-learning model, each of the plurality of spatially-contiguous image regions as corresponding to a chemical element.

The present disclosure also presents systems and computer readable media for performing the disclosed methods.

The present disclosure also relates to compositions for use as an FCC catalyst comprising microspheres, wherein the microspheres comprise alumina and/or clay and/or a zeolite.

BRIEF DESCRIPTIONS OF THE DRAWINGS

Figure 19B:
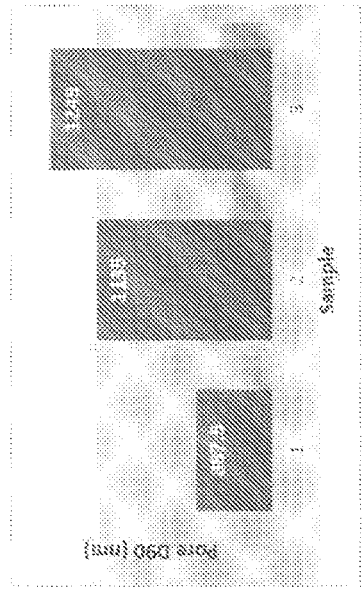
Figure 19A:

FIGS. 19A and B shows histogram plots of the AJAR and pore size for three samples.

DETAILED DESCRIPTION

The term "catalyst" or "catalyst composition" or "catalyst material" includes, e.g., a material that promotes a reaction. For example, an "oxidation material" promotes an oxidation reaction with one or more components of exhaust gas.

The term "microsphere" includes, e.g., a particle having a diameter of about 1 μm to about 500 μm. Microspheres need not be uniform in size, and may be solid or hollow. A microsphere may contain a matrix having pores.

The term "pore" includes, e.g., an opening or depression in the surface of, or a tunnel in a microsphere. A pore can be a single tunnel or connected to other tunnels in a continuous network throughout the microsphere. Pores may be characterized based on the porosity, pore size, pore volume, surface area, density, pore size distribution, and pore length.

The term "matrix" includes, e.g., the solid material that constitutes an FCC microsphere. The matrix can refer to clay (such as calcined kaolin clay) and/or alumina.

The term "interparticle voids" includes, e.g., the void space in a material, e.g., between microspheres.

The term "very large macropore" includes, e.g., macropores with equivalent diameter larger than 1 micron.

The term "large macropore" includes, e.g., macropores that are larger than 0.5 microns.

The term "zeolite" includes, e.g., a crystalline material which may in particulate form in combination with one or more promoter metals to be used as catalysts. Zeolites are materials based on an extensive three-dimensional network of oxygen ions containing generally tetrahedral-type sites and having a substantially uniform pore distribution, with a substantially uniform pore size no larger than 20 Å. Zeolites include, e.g., aluminosilicates and aluminophosphates. The term "aluminophosphates" is a specific example of a molecular sieve, including aluminum and phosphate atoms. Aluminophosphates are crystalline materials having rather uniform pore sizes.

The aluminosilicates may have an open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules are generally removable.

Any structure type of molecular sieve can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

Zeolites also include, e.g., compositions of aluminosilicate, borosilicate, gallosilicate, MeAPSO, and MeAPO. The zeolite can be a natural or synthetic zeolite such as faujasite, chabazite, clinoptilolite, mordenite, silicalite, zeolite X, zeolite Y, ultrastable zeolite Y, ZSM-5, ZSM-12, SSZ-3, SAPO 5, offretite, or a beta zeolite. In one or more specific embodiments, the zeolite is selected from Type A, chabazite, erionite, ZSM-5, ZSM-11, ZSM-23, ZSM-48, ferrierite, stilbite, faujasite, mordenite, Type L, Omega, beta, AlPO4, borosilicates, MeAPO, MeAPSO, and SAPO. In some embodiments, the molecular sieve has a BEA structure type.

The term "binder" includes, e.g., a compound which imparts adhesion and/or cohesion between the zeolitic material particles to be bonded which goes beyond the physisorption which may be present without a binder. The binder can be, e.g., colloidal silica, a peptized alumina, aluminum phosphate, and combinations thereof.

As used herein, the term "about" or "approximately" allows a 5% deviation from the given value. Alternatively, the term "about" includes the standard deviation or variance for a given value, if available.

As used herein, the term "free of" includes that the material has less than 5% of the recited element. In some embodiments, the material may have less than 3% of the recited element.

The microsphere analysis tool (MAT) of the present disclosure provides tools and methods for data analysis and mining and the development and selection of predictive models. The characterization of the porosity and composition a microspheric sample occurs in three main phases: (1) a machine learning model is trained using a lake of data gathered from BSE images and/or EDX images; (2) BSE images are taken a new sample for which analysis is requested; and (3) the porosity and (4) optionally, size, and shape distribution of the intra-particle pores and intra-particle voids is predicted using the trained machine learning model.

Broadly, the MAT may generate a prediction of the porosity and/or elemental distribution and/or size or shape distribution of the intra-particle pores and intra-particle voids based on information gathered in the data lake. The data may be pre-processed using explorative data analysis techniques, such as principal component analysis, and self-organized mapping. Key input variables may be identified based on correlations between the variables. Various machine learning techniques may then be screened using the preliminary dataset. Based on the results of the screening, a specific machine learning technique may be chosen and refined using the complete dataset.

The prediction may reveal features of undesired microsphere microporosity that cannot be characterized by other methods, such as the causes and correlations of high microsphere attrition.

Figure 1:
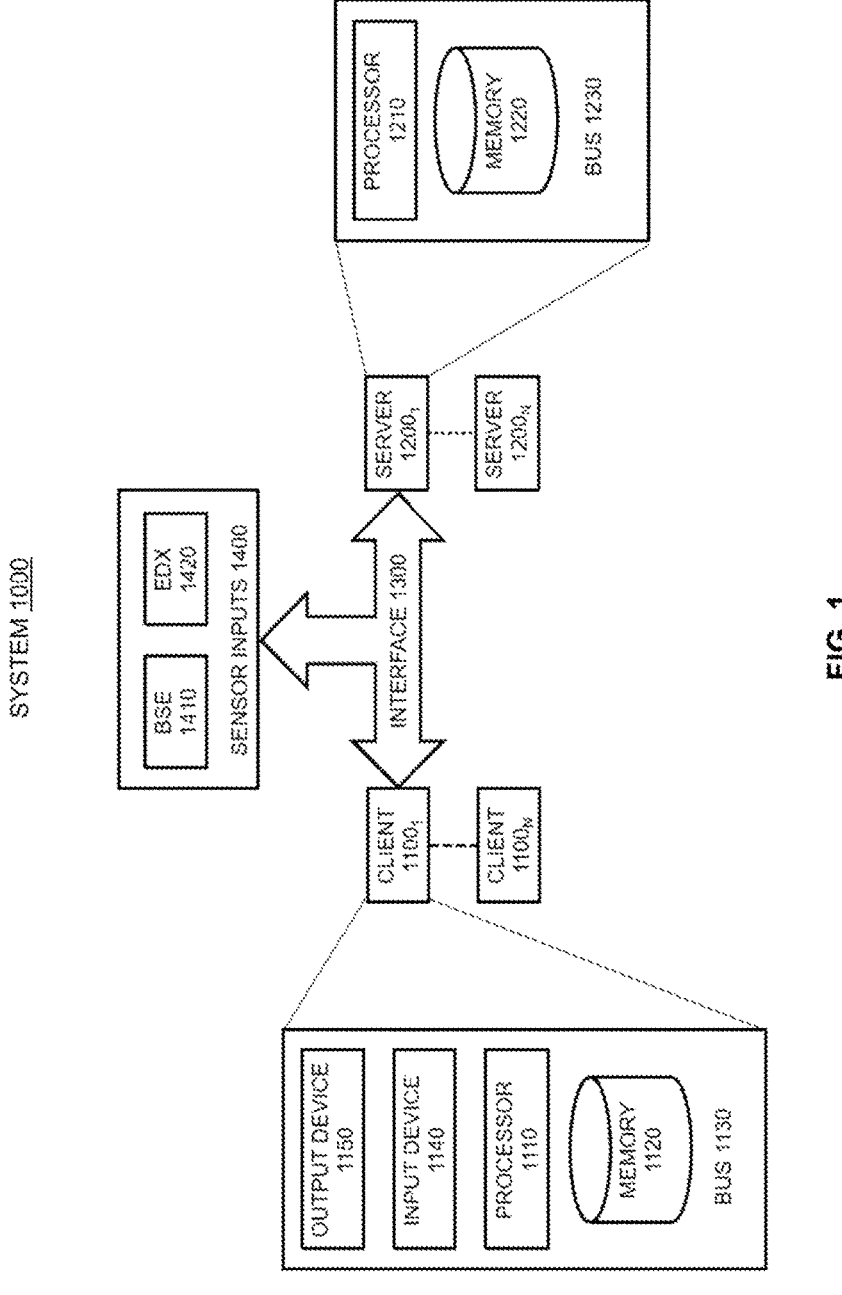
FIG. 1 shows an exemplary system 1000 for performing methods consistent with the present disclosure.

FIG. 1 shows an exemplary system 1000 for performing methods consistent with the present disclosure.

As shown in FIG. 1, system 1000 may be implemented using a client/server architecture, including one or more client-side processing devices $1100_{1-N}$ executing user applications, and one or more server-side processing devices $1200_{1-N}$ executing server applications. The client-side processing device(s) 1100 may communicate with the server-side processing device(s) 1200 via an electronic interface 1300, e.g., a wired and/or wireless communication interfaces, such as a wide-area network (WAN) interface, a local area network (LAN) interface, or the Internet. Alternatively, system 1000 may be implemented as a stand-alone processing device, e.g., processing device $1100_1$.

The client-side processing device(s) 1100 may be implemented as thin clients or thick clients, e.g., using personal computers, server terminals, mobile devices, etc., and may take the form of, e.g., desktop, laptop, or hand-held devices. As shown in FIG. 1, the client-side processing device(s) 1100 may each include one or more processing units 1110 and memories 1120 operatively coupled by a bus 1130.

Processing unit 1110 may include one or more processors (e.g., microprocessors) programmed to perform methods consistent with this disclosure and associated hardware, software, and/or hardwired logic circuitry. The processors may operate singly or in parallel. Memory 1120 may include non-transitory computer-readable media, e.g., both read-only memory (ROM) and random-access memory (RAM). At various times, computer-readable instructions, data structures, program modules, and data necessary for execution of the methods disclosed herein may be stored in ROM and/or RAM portions of memory 1120. In particular, memory 1120 may store an operating system, one or more client-side application programs (e.g., computer or mobile applications programs) and/or program modules, and program data. Bus 1130 may include a memory bus or memory controller, a peripheral bus, and a local bus, each implemented using any of a variety of bus architectures.

The client-side processing device(s) 1100 may each also include one or more user input devices 1140 and output devices 1150. The output devices may include, e.g., a monitor, display, speaker, and/or printer for outputting information to a user. User input devices 1140 may include, e.g., a keyboard, microphone, scanner, and/or a pointing device, such as a mouse or touchscreen, for entering commands or data in cooperation with a graphical user interface displayed on a display or monitor.

The server-side processing device(s) 1200 may be implemented using personal computers, network servers, web servers, file servers, etc. As shown in FIG. 1, the server-side processing device(s) 1200 may each include one or more processing units 1210 and memories 1220 operatively coupled by a bus 1230.

Processing unit 1210 may include one or more processors (e.g., microprocessors) programmed to perform methods consistent with this disclosure and associated hardware, software, and/or hardwired logic circuitry. The processors may operate singly or in parallel. Memory 1220 may include non-transitory computer-readable media, e.g., both read-only memory (ROM) and random-access memory (RAM). At various times, computer-readable instructions, data structures, program modules, and data necessary for execution of the methods disclosed herein may be stored in ROM and/or RAM portions of memory 1220. In particular, memory 1220 may store an operating system, one or more server-side application programs and/or program modules, and program data. Bus 1230 may include a memory bus or memory controller, a peripheral bus, and a local bus, each implemented using any of a variety of bus architectures.

In some implementations, system 1000 may further include one or more sensor inputs 1400 for providing data needed to perform methods consistent with this disclosure. The sensor inputs may include laboratory and/or test equipment for gathering such data, such as a backscattered electron microscope (BSE) 1410, and an energy-dispersive X-ray spectrometer (EDX) 1420.

Figure 2:
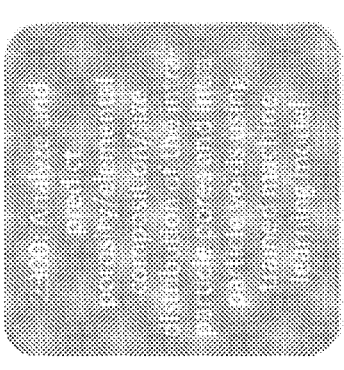
FIG. 2 is a flow chart showing a method 2000 for characterizing the porosity, elemental composition, and size distribution of the intra-particle pores and intra-particle voids of a microspheric material.
Figure 2:
Figure 2:
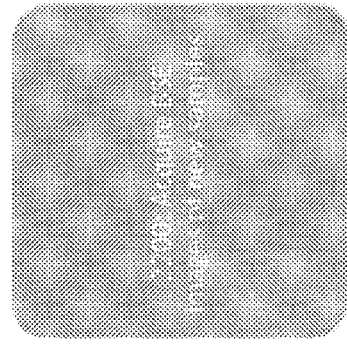
Figure 2:
Figure 2:
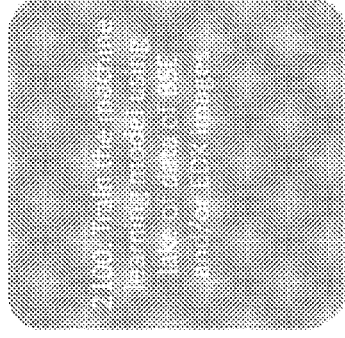

FIG. 2 is a flow chart broadly showing a method 2000 for characterizing the porosity and/or the elemental composition and/or size distribution of the intra-particle pores and intra-particle voids of a microspheric material. Method 2000 may be implemented by executing computer-readable instructions, data structures, and/or program modules stored in memories 1120 and/or 1220.

In Step 2100, a machine learning model may be trained using a lake of data gathered from a first set of BSE images and/or EDX images. For example, the data may be gathered using one or more sensor inputs, such as BSE 1410, and EDX 1420. The data lake may be stored in one or more of memories 1120 and/or 1220 and may further be distributed across multiple such memories. The machine learning module may be trained and executed using one or more of server-side processing devices 1200, by one or more client-side processing devices 1100, or a combination of such devices operating serially and/or in parallel.

In Step 2200, BSE images data from a new sample to be analyzed are acquired. For example, the data may be gathered using the same or different inputs as Step 2100, such as BSE 1410.

In Step 2300, the analysis of the porosity and/or elemental and/or size distribution of the intra-particle pores and intra-particle voids a microspheric sample is predicted using the trained machine learning model. For example, the analysis may be determined by the trained machine learning model operating on one or more of server-side processing devices 1200, on one or more client-side processing devices 1100, or a combination of such devices operating serially and/or in parallel and output to the user using an output device 1150, such as a display or printer.

Figure 3:
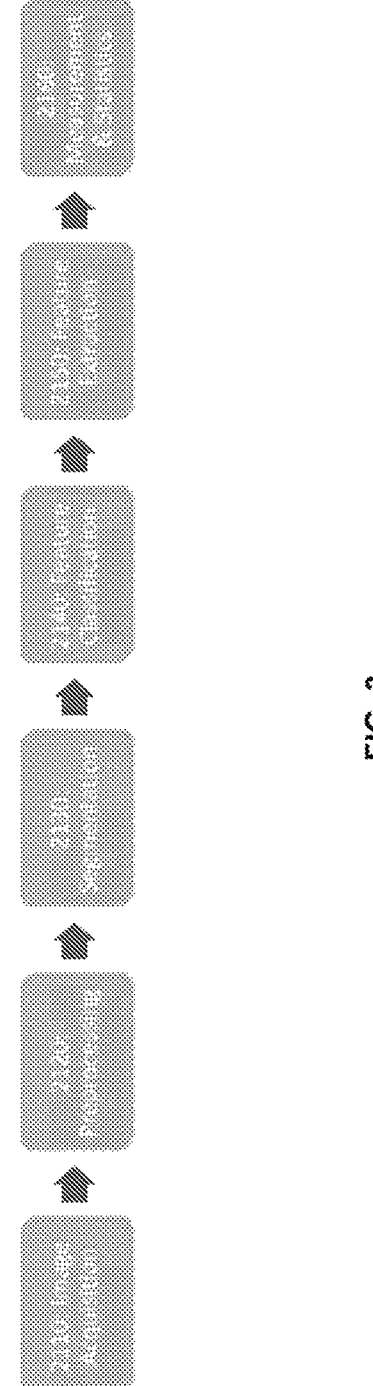
FIG. 3 is a flow chart showing further details of a method 2000 for of FIG. 2.

FIG. 3 is a flow chart showing the method 2000 of FIG. 2 in more detail. In particular, FIG. 3 shows certain sub-Steps that may be performed within Steps 2100 to 2300.

As shown in FIG. 3, a machine learning model is trained using a lake of data gathered from a first set of BSE images and/or EDX images (Step 2100). BSE images and/or EDX images of a sample are acquired (Sub-Step 2110). Images may be preprocessed (such as cropping) (Sub-Step 2120) and machine learning techniques are applied to these images for semantic segmentation (Sub-Step 2130). Individual pixels are categorized according to the pool of pre-determined key features during training and uniquely colorized based on these key features (Sub-Step 2140). Neighboring pixels of the same feature are grouped together as objects that can be extracted for measurements (Sub-Step 2150). Measurements of every object in every feature class provide statistical analysis (Sub-Step 2160).

The systems and methods described herein may be implemented with respect to a wide range of microspheric materials. In some implementations, for example, the catalyst may be an FCC catalyst. The catalyst may comprise, e.g., silica, alumina, and zeolites. In other implementations, the microspheric material may be a material not yet subject to in situ crystallization.

Figure 4A:
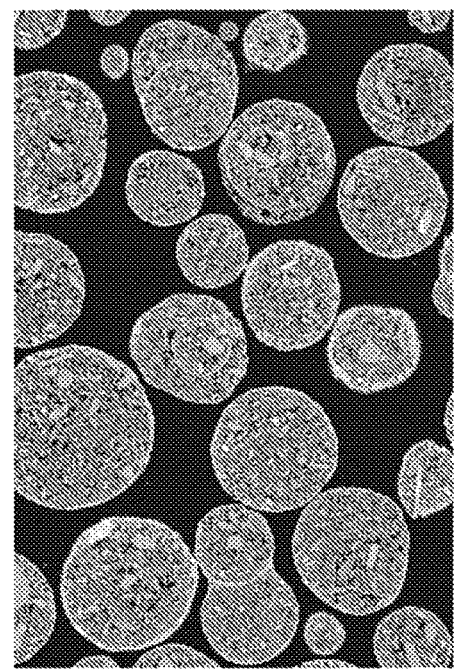
FIG. 4A shows a BSE image of a sample E.
Figure 4B:
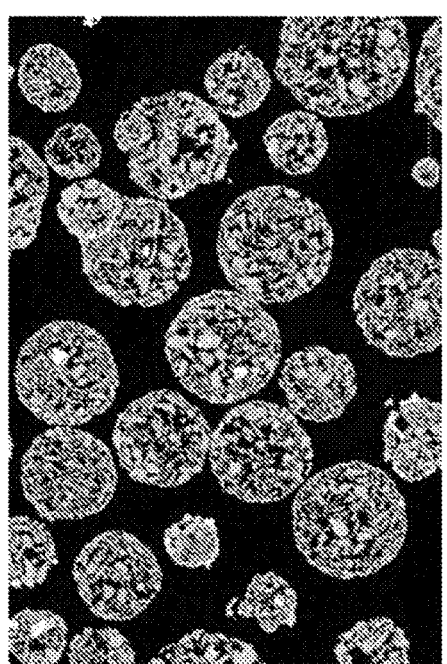
FIG. 4B shows a BSE image of a sample H.

FIGS. 4A and 4B show exemplary first set of BSE images of a lake of data collected from a sample of exemplary FCC catalysts E and H.

Figure 5A:
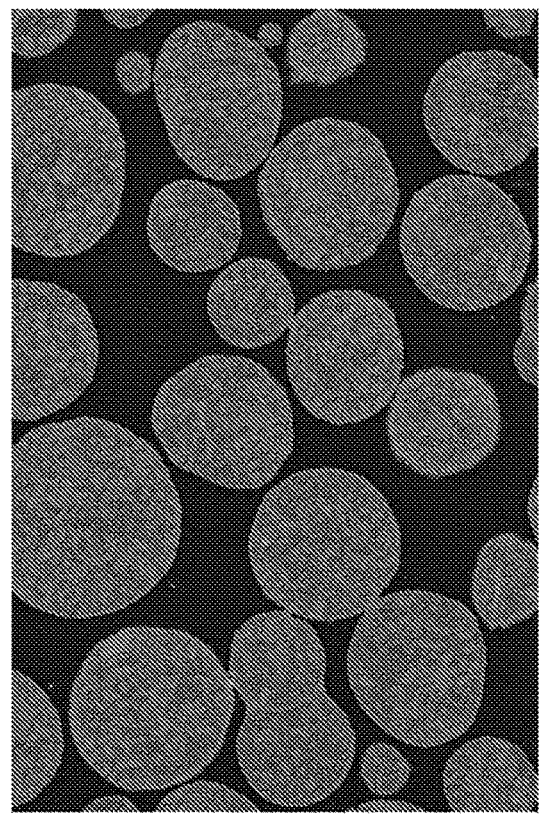
FIG. 5A shows an analysis image of FIG. 4A color coded by the MAT.
Figure 5B:
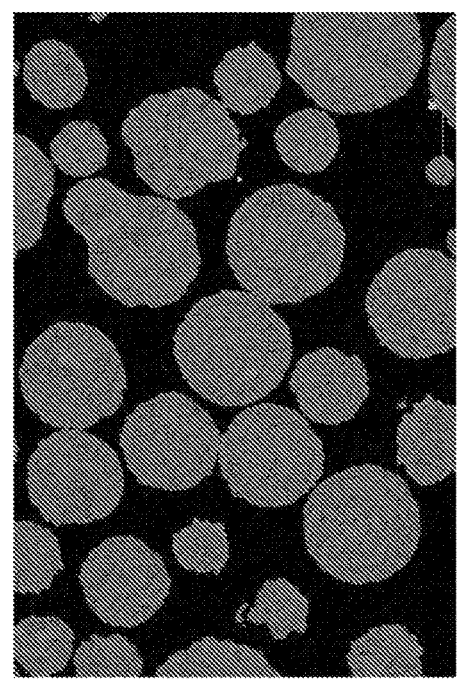
FIG. 5B shows an analysis image of FIG. 4B color coded by the MAT.

FIGS. 5A and 5B show the same field of view as FIGS. 4A and 4B after Step 2150. The microspheres are colored in green and solid matter (alumina, kaolin clay, sodium silicate) is colored in blue.

FIG. 6, FIG. 7, and FIGS. 8A-8C show statistical analysis of the microsphere after Step 2160.

Figure 9:
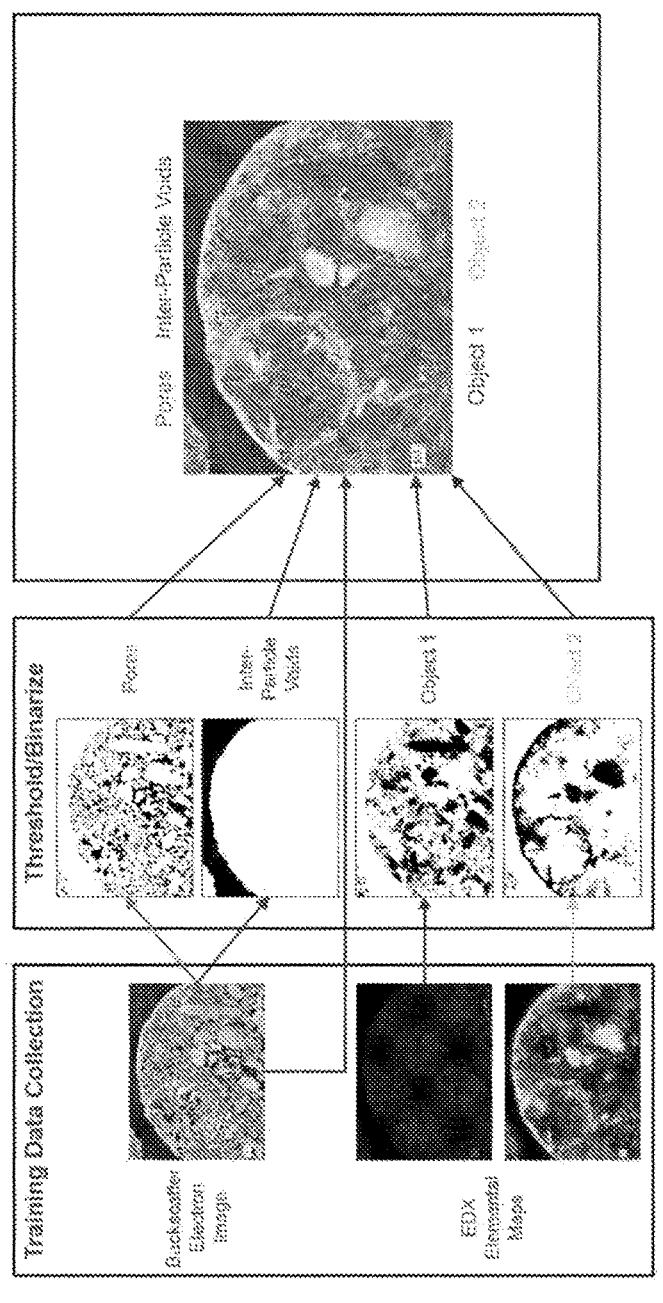
FIG. 9 is a flow chart showing a method 3000 for characterizing the composition of a microspheric material.
Figure 12:
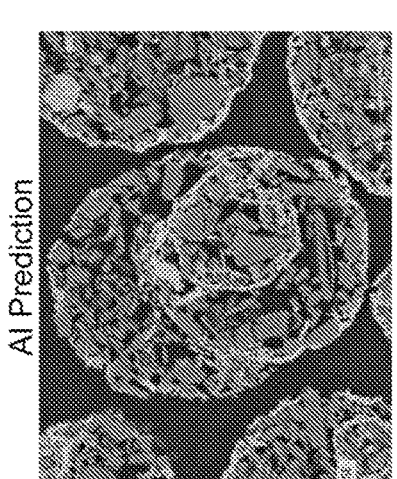
FIG. 12 shows a prediction by the MAT of the elemental composition of the micropores in the BSE image of the microspheric sample in FIG. 7.
Figure 11:
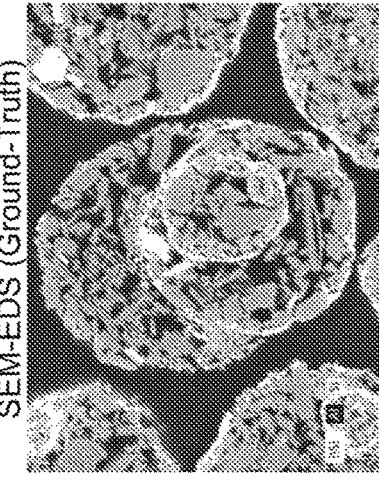
FIG. 11 shows a EDX image of the microspheric sample shown in FIG. 7.
Figure 10:
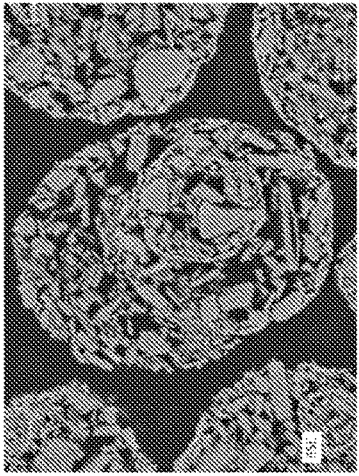
FIG. 10 shows a BSE image of a microspheric sample.
Figure 13B:
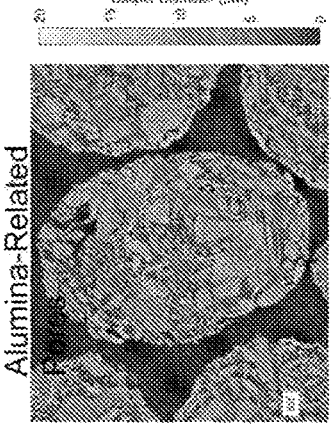
FIG. 13B shows a prediction by the MAT of the equivalent diameter of the intra-particle pores of the microspheres in the BSE image of the microspheric sample in FIG. 7.
Figure 13A:
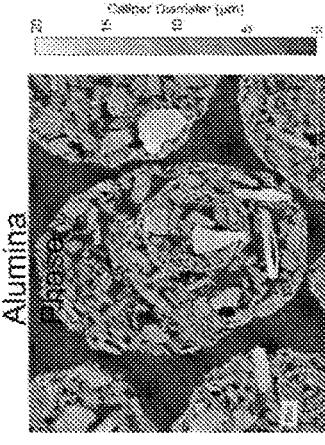
FIG. 13A shows a prediction by the MAT of the alumina composition of the micropores in the BSE image of the microspheric sample in FIG. 7.
Figure 14:
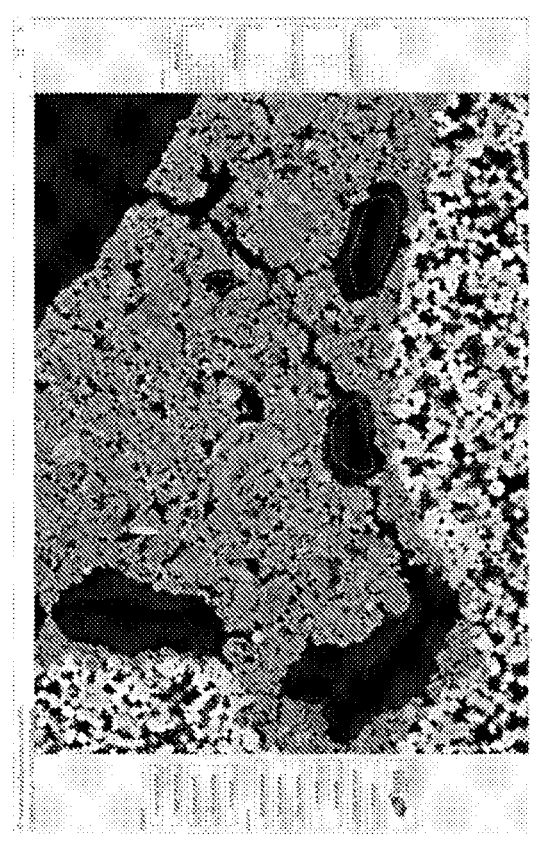
FIG. 14 shows the manual identification of intra-particle pores and inter-particle voids.
Figure 17:
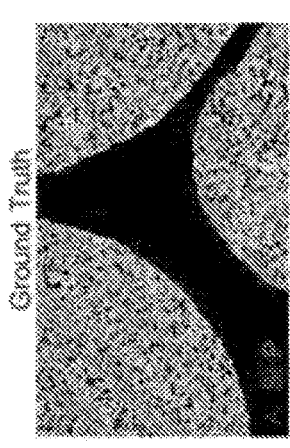
FIG. 17 shows EDX image of the microspheric sample shown in FIG. 15.
Figure 16:
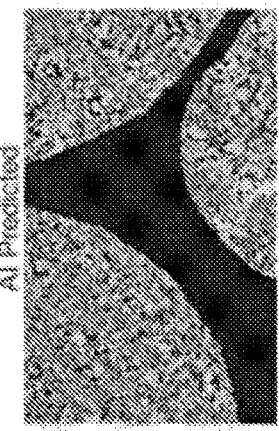
FIG. 16 shows a prediction by the MAT of the phase distribution of the micropores in the BSE image of the microspheric sample in FIG. 15.
Figure 15:
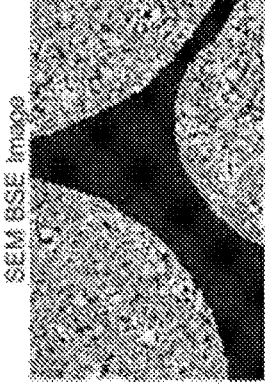
FIG. 15 shows a BSE image of a microspheric sample.
Figure 18:
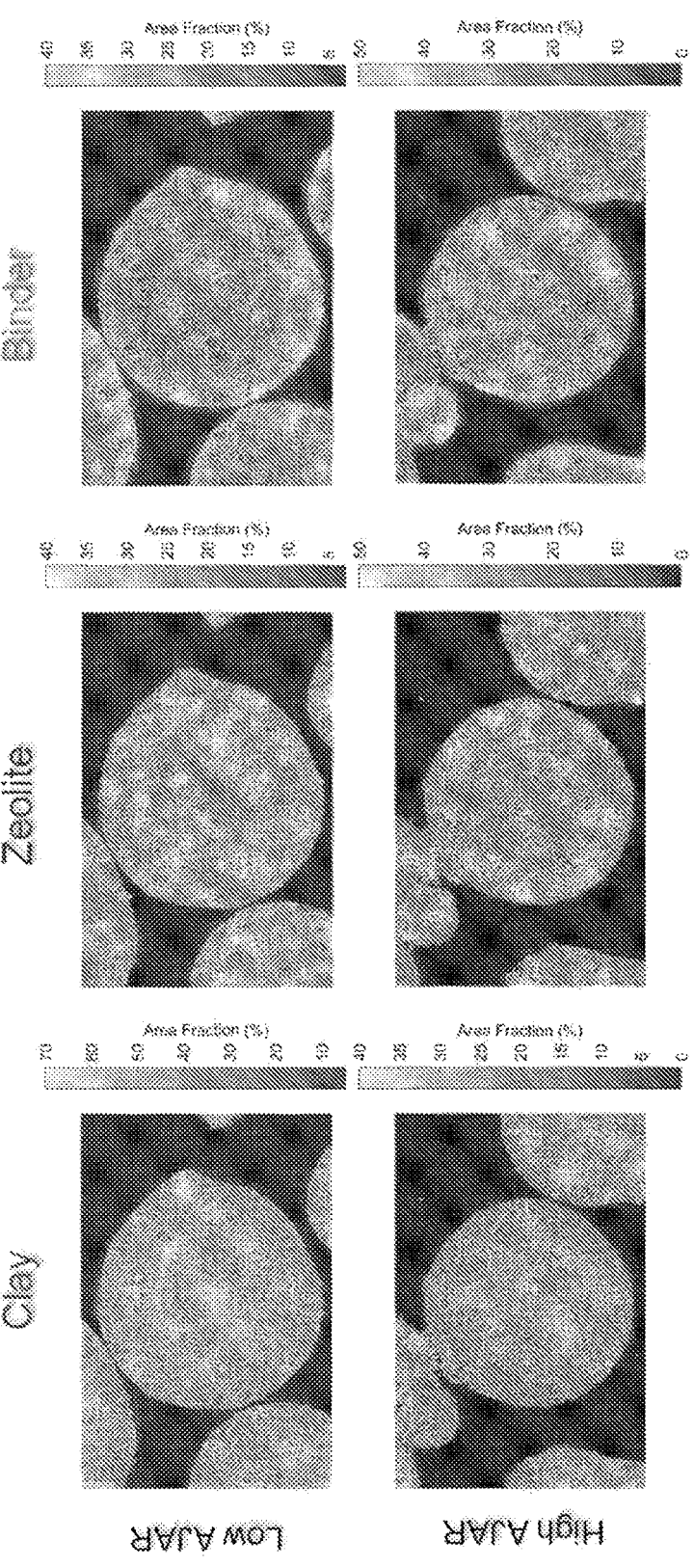
FIG. 18 shows images mapping the phase distribution by area fraction of two microspheric sample (one with a low Air Jet Attrition Rate (AJAR) and one with a high AJAR).

FIG. 9 is a flow chart showing another method 3000 for characterizing the porosity and/or the elemental composition and/or size distribution of the intra-particle pores and intra-particle voids of a microspheric material. Method 3000 may be implemented by executing computer-readable instructions, data structures, and/or program modules stored in memories 1120 and/or 1220.

In Step 3100, system 1000 may extract training data comprising one or more BSE images and/or EDX images and identify parameters or features from each image, such that each parameter or feature is collected from each respective image in the plurality of samples. For example, the system may extract a set of training data as described above in conjunction with FIGS. 2-3.

In Step 3200, the training data may be classified in accordance with at least one structural, elemental, or physical characteristics described in the training data. For example, the training data may be classified in accordance with an identification of pores, or interparticle voids, or the detection of alkali metals (such as but not limited to sodium, potassium, cesium), alkaline earth metals (such as but not limited to calcium, barium), transition metals (such as but not limited to iron, nickel, copper, yttrium, and vanadium), post-transition metals (such as but not limited to aluminum), metalloids (such as but not limited to silicon), non-metal elements (such as phosphorus, sulfur, selenium, and halogens), and actinides and lanthanides (such as but not limited to lanthanum or cerium).

In Step 3300, the system may generate a machine learning model, which may be trained based on the chosen features or parameters, to predict pore size distribution and elemental composition distribution of an FCC catalyst. The machine learning model may be trained using supervised or unsupervised training techniques.

Supervised learning allows for prediction based on the data model that may be generated from the training set. Suitable supervised learning techniques may include, e.g., Decision Tree, K-Nearest Neighbors, and Gaussian Naïve Bayes techniques. Unsupervised learning methods generate the data model from the training data itself. Suitable supervised learning techniques may include, e.g., Artificial Neural Networks, Support Vector Machine, Linear Discriminant Analysis, and Logistic Regression techniques. Other suitable supervised and unsupervised learning techniques may be used, such as Bayesian Net Genetic Algorithms/Genetic Programming, Simulated Annealing, Tangled Hierarchies of Sets, Recursive Partitioning, Clustering, Hidden Markov Models, Fuzzy Methods, Semantic Networks, Naïve Bayes Similarity Mapping, Support Vector Machines, Self-organizing Maps, and Gaussian Process techniques.

The present disclosure also relates to compositions for use as an FCC catalyst comprising microspheres, wherein the microspheres comprise alumina and/or clay and/or a zeolite.

In some embodiments, the composition comprises microspheres, wherein the microspheres comprise a zeolite, clay, and a binder with or without phosphorous or alumina. In some embodiments, the binder is chosen from a colloidal silica, a peptized alumina, aluminum phosphate, and combinations thereof. In some embodiments, the microspheres comprise clay and a zeolite.

In some embodiments, the zeolite is selected from the group consisting of faujasite (Y, USY, REO-Y), ZSM-5, Beta, FER, ZSM-11, ZSM-22, ZSM-35, MSM-68, chabazite and combinations thereof. In some embodiments, the zeolite is modified by an element. In at least one embodiment, the element is selected from the group consisting of phosphorus and transition metals (Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury).

In some embodiments, the compositions of the present disclosure comprise microspheres comprising macropores having an equivalent diameter larger than 1 micron. In some embodiments, the macropores have an equivalent diameter ranging from about 1 micron to about 30 microns, such as from about 1 micron to about 10 microns, such as from about 1 micron to about 20 microns, such as from about 1 micron to about 30 microns, such as from about 2 microns to about 30 microns, such as from about 2 microns to about 10 microns, such as from about 2 microns to about 20 microns, such as from about 2 microns to about 30 microns, such as from about 5 microns to about 10 microns, such as from about 5 microns to about 15 microns, such as from about 5 microns to about 20 microns, such as from about 5 microns to about 25 microns, such as from about 5 microns to about 30 microns, such as from about 10 microns to about 12 microns, such as from about 10 microns to about 14 microns, such as from about 10 microns to about 16 microns, such as from about 10 microns to about 18 microns, such as from about 10 microns to about 20 microns, such as from about 10 microns to about 22 microns, such as from about 10 microns to about 24 microns, 10 microns to about 26 microns, such as from about 10 microns to about 28 microns, such as from about 10 microns to about 30 microns.

In some embodiments, the compositions of the present disclosure comprise very large macropores larger than 10 microns. In some embodiments, the fraction of macropores larger than 10 microns ranges from about 50 ppm to about 1850 ppm, such as from about 100 ppm to about to 1850 ppm, such as from about 150 ppm to about to 1850 ppm, such as from about 200 ppm to about to 1850 ppm, such as from about 250 ppm to about to 1850 ppm, such as from about 300 ppm to about to 1850 ppm, such as from about 350 ppm to about to 1850 ppm, such as from about 400 ppm to about to 1850 ppm, such as from about 450 ppm to about to 1850 ppm, such as from about 500 ppm to about to 1850 ppm, such as from about 600 ppm to about to 1850 ppm, such as from about 650 ppm to about to 1850 ppm, such as from about 700 ppm to about to 1850 ppm, such as from about 750 ppm to about to 1850 ppm, such as from about 800 ppm to about to 1850 ppm, such as from about 850 ppm to about to 1850 ppm, such as from about 900 ppm to about to 1850 ppm, such as from about 950 ppm to about to 1850 ppm, such as from about 1000 ppm to about to 1850 ppm, such as from about 1050 ppm to about to 1850 ppm, such as from about 1100 ppm to about to 1850 ppm, such as from about 100 ppm to about to 1850 ppm, such as from about 100 ppm to about to 1850 ppm, such as from about 1150 ppm to about to 1850 ppm, such as from about 1200 ppm to about to 1850 ppm, such as from about 1250 ppm to about to 1850 ppm, such as from about 1300 ppm to about to 1850 ppm, such as from about 1350 ppm to about to 1850 ppm, such as from about 1400 ppm to about to 1850 ppm, such as from about 1450 ppm to about to 1850 ppm, such as from about 1500 ppm to about to 1850 ppm, such as from about 1550 ppm to about to 1850 ppm, such as from about 1600 ppm to about to 1850 ppm, such as from about 1650 ppm to about to 1850 ppm, such as from about 1700 ppm to about to 1850 ppm, such as from about 1750 ppm to about to 1850 ppm, such as from about 1800 ppm to about to 1850 ppm.

In some embodiments the compositions of the present disclosure comprise microspheres comprising very large macropores characterized by mean pore area. In some embodiments, the macropores have a mean pore area ranging from about 0.2 $\mu m^2$ to about 2.0 $\mu m^2$, such as from about 0.3 $\mu m^2$ to about 2.0 $\mu m^2$, such as from about 0.4 $\mu m^2$ to about 2.0 $\mu m^2$, such as from about 0.5 $\mu m^2$ to about 2.0 $\mu m^2$, such as from about 0.6 $\mu m^2$ to about 2.0 $\mu m^2$, such as from about 0.7 $\mu m^2$ to about 2.0 $\mu m^2$, such as from about 0.8 $\mu m^2$ to about 2.0 $\mu m^2$, such as from about 0.9 $\mu m^2$ to about 2.0 $\mu m^2$, such as from about 1.0 $\mu m^2$ to about 2.0 $\mu m^2$, such as from about 1.1 $\mu m^2$ to about 2.0 $\mu m^2$, such as from about 1.2 $\mu m^2$ to about 2.0 $\mu m^2$, such as from about 1.3 $\mu m^2$ to about 2.0 $\mu m^2$, such as from about 1.4 $\mu m^2$ to about 2.0 $\mu m^2$, such as from about 1.5 $\mu m^2$ to about 2.0 $\mu m^2$, such as from about 1.6 $\mu m^2$ to about 2.0 $\mu m^2$, such as from about 1.7 $\mu m^2$ to about 2.0 $\mu m^2$, such as from about 1.8 $\mu m^2$ to about 2.0 $\mu m^2$, such as from about 1.9 $\mu m^2$ to about 2.0 $\mu m^2$.

In some embodiments the compositions of the present disclosure comprise microspheres comprising very large macropores characterized by mean porosity. In some embodiments, the macropores have a mean porosity ranging from about 5% to about 21%, such as from about 6% to about 21%, such as from about 7% to about 21%, such as from about 8% to about 21%, such as from about 9% to about 21%, such as from about 10% to about 21%, such as from about 11% to about 21%, such as from about 12% to about 21%, such as from about 13% to about 21%, such as from about 14% to about 21%, such as from about 15% to about 210%, such as from about 16% to about 210%, such as from about 17% to about 21%, such as from about 18% to about 21%, such as from about 19% to about 21%, such as from about 20% to about 210%.

In some embodiments the compositions of the present disclosure comprise microspheres comprising large macropores characterized by d90. In some embodiments, the macropores have a d90 ranging from about 0.5 to about 1.1 $\mu m$, such as from 0.6 to about 1.1 $\mu m$, such as from 0.7 to about 1.1 $\mu m$, such as from 0.8 to about 1.1 $\mu m$, such as from 0.9 to about 1.1 $\mu m$, such as from 1.0 to about 1.1 $\mu m$, such as from about 0.5 to about 0.7 µm, such as from 0.5 to about 0.9 µm, such as from 0.6 to about 0.8 µm, such as from 0.8 to about 1.0 µm.

EXAMPLES

The following non-limiting Examples illustrate various aspects and features of the disclosed systems and methods and computer readable media.

This disclosure analyzes very large macropores of some FCC catalyst precursors, prior to Y zeolite crystallization. Some FCC catalyst precursors (samples F-I) have excess macroporosity in very large macropores. Very large macropores are macropores with equivalent diameter larger than 1 micron. Some characteristics of very large macropores correlate with, and we believe are the cause of, poor attrition resistance. This disclosure also analyzes large macropores of some FCC catalysts, containing zeolite. Large macropores are macropores larger than 0.5 microns. In some cases, large macropore properties shown in herein correlate with the cause of poor attrition resistance.

Example 1

Two grades of flash calcined gibbsite (FCG), namely A and B, were obtained from a commercial production plant and were calcined at 800° C. Slurries of the calcined FCG, without additional milling, were made by adding each of Samples A and B to water with vigorous mixing and then adding hydrous clay slurry to form a composition of 3 parts by weight alumina to 1 part by weight hydrous kaolin clay, together with sodium silicate. Sample I was made from grade A of calcined FCG while samples F, G, and H were made from grade B of calcined FCG. Samples F, G, and H differ in the amount of sodium silicate used in the slurry, as described in a table below.

Samples G and I and an additional Sample E were prepared by first embedding in epoxy resin, followed by polishing and carbon-coating. Cross-sectional SEM imaging were performed in a backscatter electron mode at a fixed magnification of 300×.

Two SEM images of vastly different porosity levels were manually annotated with three feature classes: (a) pores, (b) matrix, and (c) interparticle voids. In FIGS. 4A and 4B, pores and the space in between microspheres are black while alumina and kaolin clay are shown as white or grey. These "structured" image data were then input to an artificial neural network configured for deep-learning. Because the SEM images were collected at high-pixel resolution, each of them were broken up into 5×5 tiles for training augmentation, yielding a total of 50 effective training images. Then, 500 epochs of training iterations were conducted to enhance model accuracy in differentiating between pores and inter-particle voids-both of which are similarly black entities with only contextual differences.

The trained artificial intelligence model was then deployed for automated semantic segmentation of four SEM images from each Sample F, G, H, and I. Once the segmentations were verified for accuracy, recipes/macros were built in MIPAR environment to measure and quantify various physical attributes of the pores in the microspheres. In particular, the Parent-Child analysis method was employed to determine porosity levels on an individual particle basis. Here, the parent was defied as a microsphere, and the child as pores within a microsphere.

The AI counted a large numbers of pores in each sample, as shown in Table 2 below.

Example 2

Five microsphere samples were prepared based on Table 1.

TABLE 1

| Sample | Composition |
| --- | --- |
| E | 45 wt % gamma alumina, |
|  | 22% hydrous clay, |
|  | 11% calcined clay, and |
|  | 12% crystalline boehmite |
|  | 10% sodium silicate |
| F | 69% calcined FCG B |
|  | 23% hydrous clay |
|  | 8% sodium silicate |
| G | 68% calcined FCG B |
|  | 23% hydrous clay |
|  | 9.5% sodium silicate |
| H | 71% calcined FCG B |
|  | 23% hydrous clay |
|  | 6% sodium silicate |
| I | 71% calcined FCG A |
|  | 23% hydrous clay |
|  | 6% sodium silicate |

Samples F, G, H, and I each have a simpler composition than Sample E. The basis for samples F, G, H, and I is 75% FCG and 25% hydrous clay after sodium silicate binder is subtracted out. Sodium silicate acts as a temporary binder, since it dissolves during zeolite crystallization. These FCC catalysts are bound both by a Y zeolite that grows on FCC matrix and by alumina crosslinking reactions that are driven by normal FCC workup processes.

Cross-sectional SEM imaging were performed for each sample under BSE mode at a fixed magnification of 300×. As shown in FIGS. 4A and 4B, pores and the space in between microspheres are shown in black, while alumina and kaolin clay are shown in white or grey. In FIGS. 5A and 25, the AI has colored microspheres as green and matter (such as for example. alumina, kaolin clay, and/or sodium silicate) as blue, using the trained artificial neural network configured for deep-learning (as developed in Example 1).

With a method for discerning pores, matrix, and interparticle voids in SEM images, FCG catalysts were analyzed and compared.

TABLE 2

| Sample | MS Roller | Mean Porosity (ppm) | Mean pore area (µm²) | Fraction of pores >10 microns in diameter (ppm) | Number of pores |
| --- | --- | --- | --- | --- | --- |
| E | 2.57 | 15.8 | 1.42 | 227 | 39609 |
| F | 8.36 | 31.5 | 3.30 | 5823 | 29535 |
| G | 7.42 | 35.4 | 3.90 | 7015 | 27510 |
| H | 7.14 | 30.6 | 2.49 | 4692 | 38960 |
| I | 9.14 | 29.5 | 2.86 | 2849 | 32818 |

In Table 2, Microsphere Roller is a test developed to measure the expected attrition of microspheres. It is a predictor of fines generated in the crystallization process. Poor attrition would result in significant yield losses, as fine particles must be removed in order to achieve particle size targets. A high percentage of fines could also bind filter belts making it difficult to achieve throughput and specification targets. Table 3 shows that, while Sample E has an acceptable Microsphere (MS) Roller ($\leq$4), Samples F-I had insufficient microsphere strength.

The MS Roller Attrition apparatus is a modified separation test for dry, finely divided microspheres. In the test, an air supply at constant pressure influences the particles in a chamber. Fines generated in the process are carried to a collection tube where they are weighed at the end of the test. The MS Roller value is expressed as percent loss per minute, such that a lower value is preferred.

EDX maps (not shown) may be rule out differences in sodium silicate distribution between these catalysts. In the present invention, AI-assisted SEM analysis shows that Samples F-I have much more porosity through their bulk. That is, the mean pore areas for the microspheres in Samples F-I are larger than for Sample E. Also, Samples F-I have larger fractions of very large macropores (greater than 10 microns). The fraction of pores with equivalent diameter larger than 10 microns is much larger for Samples F-I than for Sample E. These estimates are based on a large number of pores (28000-40000, depending in the specific microsphere design) analyzed by the AI.

Figure 6:
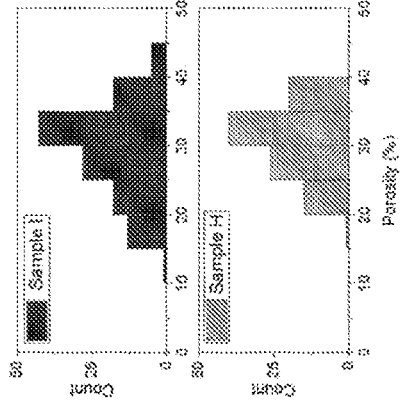
FIG. 6 shows histogram plots of the porosity of certain exemplary samples.
Figure 6:
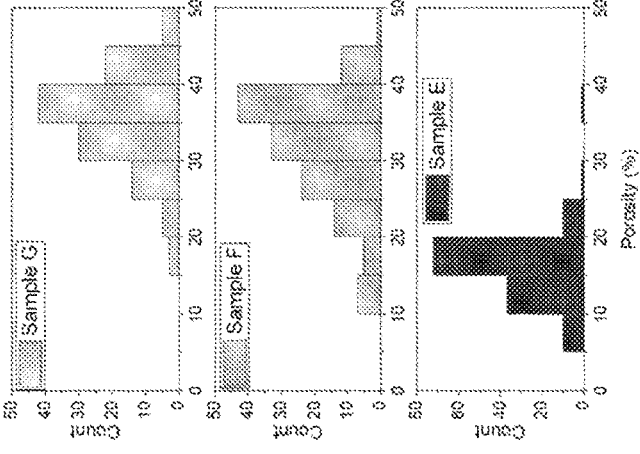
Figure 7:
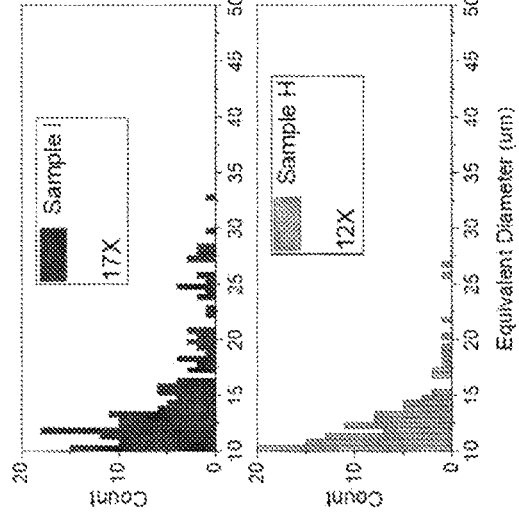
FIG. 7 shows histogram plots of the equivalent diameter of certain exemplary samples.
Figure 7:
Figure 7:
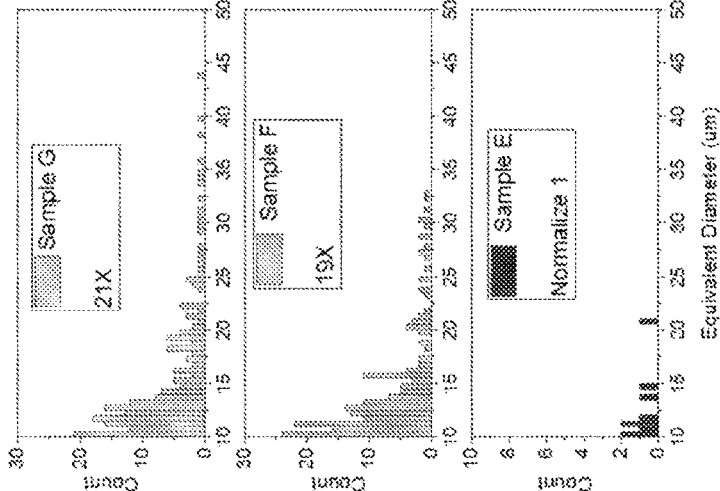
Figure 8C:
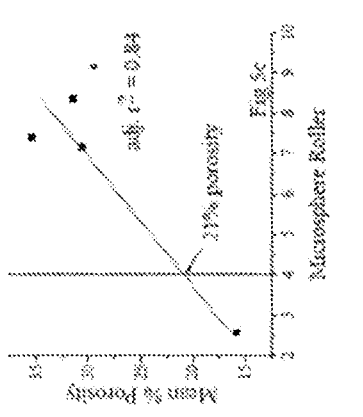
FIG. 8C shows a plot of the microsphere roller correlating with mean % porosity.
Figure 8C:
Figure 8B:
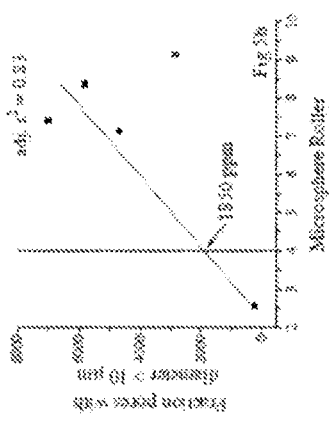
FIG. 8B shows a plot of the microsphere roller correlating with fraction of total pores.
Figure 8A:
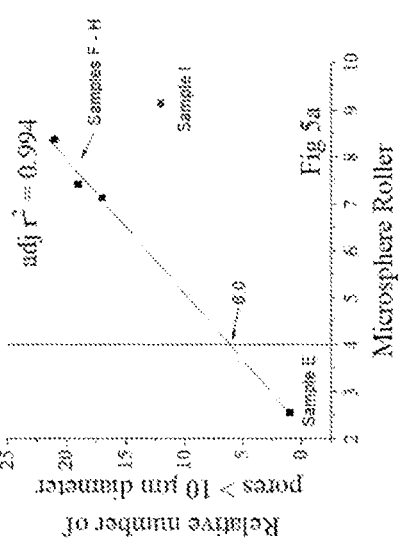
FIG. 8A shows a plot of the microsphere roller correlating with a relative number of pores.

FIG. 6 shows histograms of microsphere porosity for Samples E-I. As shown in FIG. 6, the porosity distribution of Sample E is shifted left (to smaller sizes) with respect to Samples F-I. However, Table 3 shows that the FCG microspheres have a larger mean pore diameter. As shown in FIG. 7, the microspheres in Samples F-I have 12-21 times more pores with equivalent diameter >10 $\mu$m compared to the microspheres in Sample E.

FIG. 7 suggests that Samples F-I should have microspheres with less than about 6 times the number of large pores compared to Sample E. Optimally, the absolute fraction of pores with equivalent diameter larger than 10 $\mu$m will be less than about 1850 ppm. The AI-SEM analysis indicates that mean microsphere porosity should be less than about 21%.

Example 3

Two SEM images of vastly different porosity levels were manually annotated with three feature classes: (a) pores, (b) matrix, and (c) interparticle voids. As shown in FIGS. 4A and 4B, pores and the space in between microspheres are black while alumina and kaolin clay are more white or pale grey. These "structured" image data were then input to an artificial neural network configured for deep-learning. Because the SEM images were collected at high-pixel resolution, each image was broken up into 5×5 tiles for training augmentation, yielding a total of 50 effective training images. This augmentation Step together with 500 epochs of training iterations enhances model accuracy in differentiating between pores and interparticle voids—both of which are similarly black entities with only contextual differences.

The trained model was then deployed for automated semantic segmentation of four SEM images from each Sample F, G, H, and I. Once the segmentations were verified for accuracy, recipes/macros were built in MIPAR environment to measure and quantify various physical attributes of the pores in the microspheres. In particular, the Parent-Child analysis method was employed to determine porosity levels on an individual particle basis. In this case, the parent was defined as a microsphere, and the child as pores within a microsphere.

EDX spectra of Samples F, G, H, and I were taken on a JEOL JSM-7800F field-emission SEM and the EDX detection was done using a pair of Bruker X-Flash EDS spectrometers. EDX maps of the samples were also determined and allowed for the mapping of the samples based on elemental compositions, as show in FIGS. 10-13.

Objects were labeled using unique element markers after thresholding and binarizing the respective EDS maps. Pores and inter-particle voids were labeled by thresholding the BSE image to select the lowest-intensity pixels, and then applying a size filter to separate them into these two features. All these feature-labeling layers were subsequently overlaid on the original BSE image and input to AI training software configured for deep-learning.

This training model enabled the prediction of the spatial distribution of different materials such as kaolin clay, and alumina binder in SEM cross-sectional BSE images without lengthy EDX map collection.

Example 4

The trained model trained as described in Example 3 was also used to predict a 3-phase FCC additive material which consists of a zeolite phase, a clay phase and an alumina binder phase. The trained model is not limited to 2- or 3-phase microspheric materials, but is also expected to predict four or more phase microspheric materials.

As shown in FIGS. 15-18, the model is trained to distinguish between a zeolite phase, a clay phase and an alumina binder phase based on the elemental composition of the individual phases. Based on the elemental predictions from Example 3, the model colored each element shown on the BSE image using a distinct color. For example, aluminum may be colored blue, silicon may be colored red, and phosphorus may be colored green. The trained model is instructed that clay and zeolite are composed of aluminum and silicon at different Si/Al ratios, and binder is composed of aluminum while phosphorus is distributed in the three phases at different concentrations. Each combination of elements (Al+Si, Si+P, and Al+P) may be allocated a color, e.g., purple, burgundy, and cyan, respectively which may be mapped onto the BSE image.

This training model enables the prediction of the spatial distribution of different phases, such as clay, binder, and zeolite in SEM cross-sectional BSE images.

The experimentally trained model was able to differentiate pores in the FCC microspheres from the inter-microsphere voids. Pores in FCC microspheres can be identified by the trained model as discussed in Example 1 and their sizes measured (in the form of caliper or equivalent diameters). As shown in FIGS. 19A and 19B, pore D90 size (90% percentile) of each material were found to correlate with their respective AJAR (loss wt %/hr) as defined by standard ASTM method D5757. However, it is to be understood that other methods may be used.

Other embodiments will be apparent from consideration of the specification and practice of the embodiments disclosed herein. It is intended that the specification and examples be considered as example only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various implementations), adaptations or alterations based on the present disclosure. The elements of the claims are to be interpreted broadly based on the language employed in the claims and not limited to examples described in the present Specification or during the prosecution of the Application, which examples are to be construed as nonexclusive. Further, the Steps of the disclosed methods can be modified in any manner, including reordering Steps or inserting or deleting Steps. In particular, non-dependent Steps may be performed in any order, or in parallel.

What is claimed is:

1. A method for characterizing the porosity of a microspheric material, the method comprising:
    receiving image data representative of a microscopic image of a sample microspheric material;
    segmenting the image data into a plurality of spatially-contiguous image regions;
    classifying, by a trained machine-learning model, each of the plurality of spatially-contiguous image regions as corresponding to one of:
        a particle,
        an intra-particle pore, or
        an inter-particle void; and
    characterizing the porosity of the microspheric material based on at least one of:
        a count of the intra-particle pores;
        an area of the intra-particle pores;
        an equivalent diameter of the intra-particle pores; or
        a pore-area fraction of the intra-particle pores.

2. The method of claim 1, wherein the microscopic image is obtained by one of:
    scanning electron microscopy or transmission electron microscopy.

3. The method of claim 1, wherein the microscopic image is obtained by one of:
    cross-sectional scanning electron microscopy or cross-sectional transmission electron microscopy.

4. The method of claim 1, wherein the microscopic image is obtained by backscatter electron scanning electron microscopy.

5. The method of claim 1, wherein the image data is two-dimensional image data.

6. The method of claim 1, wherein the image data is three-dimensional image data.

7. The method of claim 1, wherein characterizing the porosity of the microspheric material comprises characterizing the porosity of the microspheric material based on a count of the intra-particle pores having an area larger than a threshold area.

8. The method of claim 7, wherein the threshold area is 250 μm².

9. The method of claim 1, wherein characterizing the porosity of the microspheric material comprises characterizing the porosity of the microspheric material based on a count of the intra-particle pores having an equivalent diameter larger than a threshold diameter.

10. The method of claim 1, wherein the threshold diameter is 10 μm.

11. The method of claim 1, wherein characterizing the porosity of the microspheric material comprises characterizing the porosity of the microspheric material based on a mean area of the intra-particle pores.

12. The method of claim 1, wherein characterizing the porosity of the microspheric material comprises outputting, to a display device, a histogram of the equivalent diameter of the intra-particle pores.

13. The method of claim 1, wherein characterizing the porosity of the microspheric material comprises outputting, to a display device, a histogram of the mean area of the intra-particle pores.

14. The method of claim 1, wherein characterizing the porosity of the microspheric material comprises outputting, to a display device, a histogram of the pore-area fraction.

15. The method of claim 1, wherein the sample microspheric material is embedded in an epoxy resin prior to imaging.

16. The method of claim 1, wherein the epoxy resin is polished and carbon-coated prior to imaging.

17. The method of claim 1, wherein the machine-learning model is trained to distinguish particles, intra-particle pores, and inter-particle voids using manually-annotated image data as a ground truth reference.

18. The method of claim 1, wherein the machine-learning model comprises an artificial neural network.

19. A system comprising:
    at least one system configured to:
        receive image data representative of a microscopic image of a sample microspheric material;
        segment the image data into a plurality of spatially-contiguous image regions;
        classify, by a trained machine-learning model, each of the plurality of spatially-contiguous image regions as corresponding to one of:
            a particle,
            an intra-particle pore, or
            an inter-particle void; and
        characterize the porosity of the microspheric material based on at least one of:
            a count of the intra-particle pores;
            an area of the intra-particle pores;
            an equivalent diameter of the intra-particle pores; or
            a pore-area fraction of the intra-particle pores.

20. A non-transitory computer readable medium comprising:
    a computer program code segment used to receive image data representative of a microscopic image of a sample microspheric material;
    a computer program code segment used to segment the image data into a plurality of spatially-contiguous image regions;
    a computer program code segment used to classify, by a trained machine-learning model, each of the plurality of spatially-contiguous image regions as corresponding to one of:
        a particle,
        an intra-particle pore, or
        an inter-particle void; and
    a computer program code segment used to characterize the porosity of the microspheric material based on at least one of:
        a count of the intra-particle pores;
        an area of the intra-particle pores;
        an equivalent diameter of the intra-particle pores; or
        a pore-area fraction of the intra-particle pores.

* * * * *